Feb. 1, 1972          H. G. DAUGHERTY ET AL          3,639,399
                   PREPARATION OF AMINO-s-TRIAZINES
Filed July 10, 1969                                  2 Sheets-Sheet 1
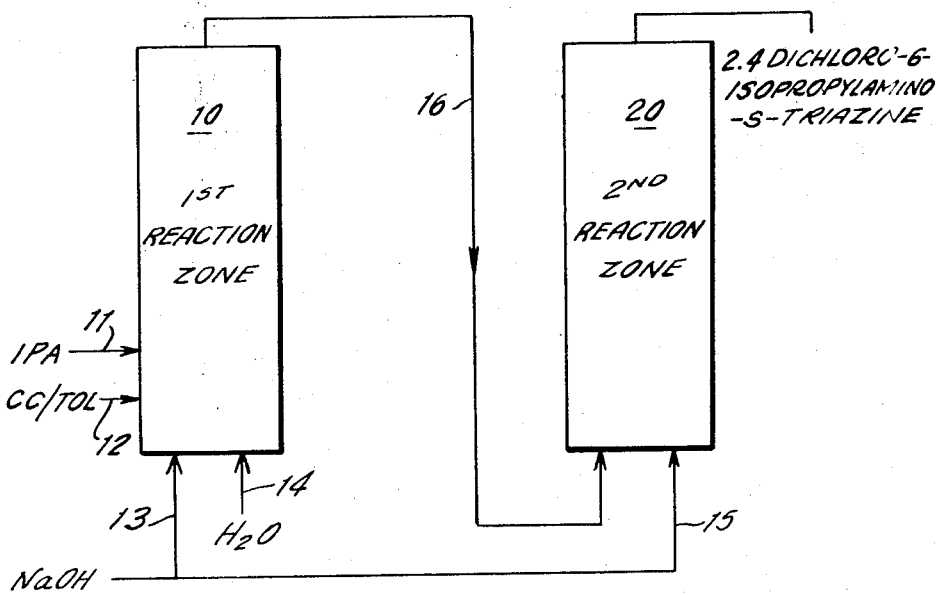
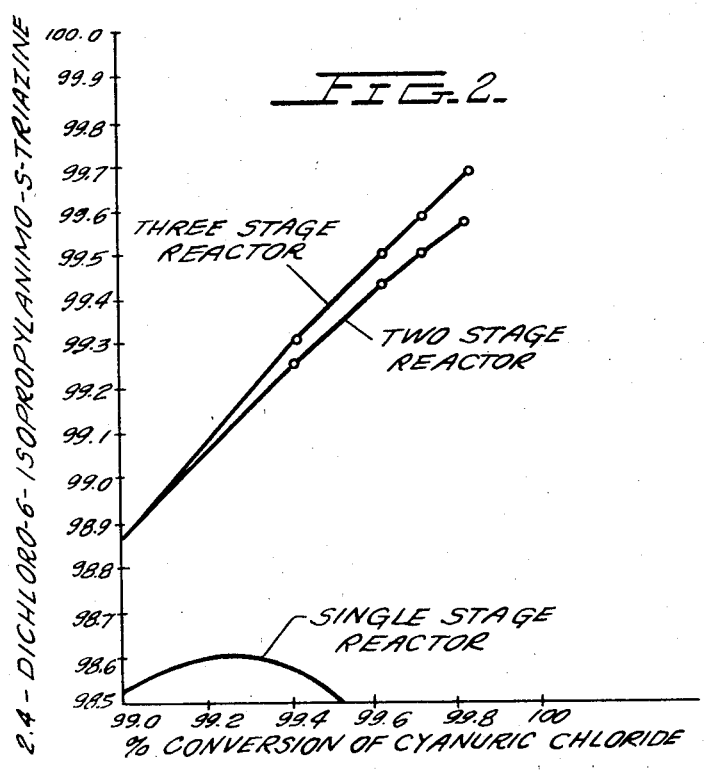
INVENTOR.
H. G. DAUGHERTY
W. J. EVERS
P. G. MC CRACKEN
BY
Karl F. Jorda
ATTORNEY

THREE STAGE
DICHLORO REACTOR

United States Patent Office 3,639,399
Patented Feb. 1, 1972

3,639,399
PREPARATION OF AMINO-s-TRIAZINES
Hiram Gerald Daugherty, McIntosh, and William J. Evers, Mobile, Ala., and Philip G. McCracken, Baton Rouge, La., assignors to Ciba-Geigy Corporation, Greenburgh, N.Y.
Filed July 10, 1969, Ser. No. 840,746
Int. Cl. C07d 55/18
U.S. Cl. 260—249.5
6 Claims

ABSTRACT OF THE DISCLOSURE

A new and improved multi-stage process is provided for preparing amino-s-triazines and particularly, 2,4-dichloro-6-amino-s-triazines which are useful as intermediates. The process involves reacting cyanuric chloride, a selected primary or secondary amine and an alkali metal hydroxide, in two or more stages, wherein about 80 to about 97% of the cyanuric chloride is converted to the 2,4-dichloro intermediate product in the first stage and additional minor proportions of the alkali metal hydroxide are added to the second, and any succeeding stages of the process to complete the desired conversion. By employing such a reaction system, it is possible to prepare intermediate reaction mixtures with insignificant hydrolysis losses and such intermediate reaction mixtures can then be readily converted to the final products, i.e., 2-chloro-4,6-diamino-s-triazines which are useful in inhibiting the growth of plants and are consequently widely employed as herbicides. The present procedure represents a marked improvement in the process for preparing the 2,4-dichloro-6-amino-s-triazine intermediate products since not only are higher yields and purities of the desired intermediate products obtained but in addition, the process is suitably adapted for large scale production.

BACKGROUND OF THE INVENTION

Field of the invention

The present invention relates to a new and improved procedure for the praparation of chloro-amino-s-triazines and more particularly, to a novel procedure for preparing 2,4-dichloro-6-amino-s-triazine compounds which are useful as intermediates in the preparation of 2-chloro-4,6-diamino-triazine compounds of known herbicidal activity. The 2,4-dichloro-6-amino-s-triazine intermediates are obtained by the present procedure in high yield.

Description of the prior art

The herbicidal activity of various chloro-diamino-s-triazines has been described, for example, in Gysin et al., U.S. Pat. No. 2,891,855. One such chloro-diamino-s-triazine which is commercially useful as a herbicide is 2-chloro-4-ethylamino-6-isopropylamino-s-triazine and this compound is commercially available as atrazine herbicide.

The aforesaid 2-chloro-4 - ethylamino-6-iso-propylamino-s-triazine may, as described in the aforesaid Gysin et al. patent, be prepared from cyanuric chloride and the corresponding organic amines. The synthesis ordinarily proceeds through the formation of the 2,4-dichloro-6-isopropylamino-s-triazine intermediate compound, in accordance with the following reaction:

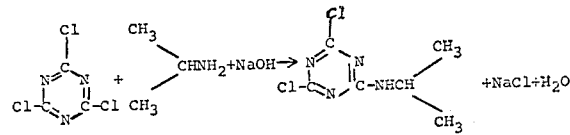

(1)

The 2,4-dichloro-6-isopropylamino-s-triazine compound is thereafter converted to the active compound, i.e., 2-chloro-4-ethylamino-6-isopropylamino-s-triazine, referred to as atrazine, by reaction with monoethylamine, as follows:

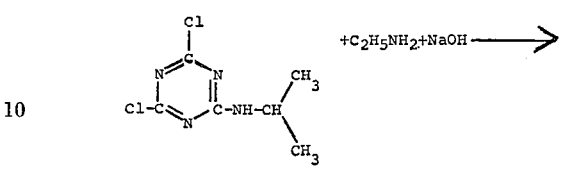

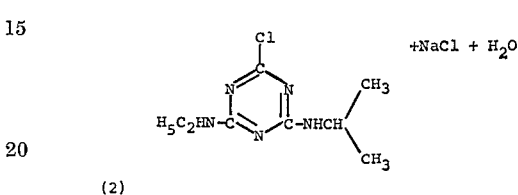

(2)

The first step noted (Equation 1 above) is accompanied by a number of undesirable side reactions which may, for example, involve the hydrolysis of various of the chloro-amino-s-triazines or the formation of various by-products such as the 2-chloro-4,6-bis-isopropylamino-s-triazine by-product. The undesired formation of the last mentioned material, insofar as the preparation of the atrazine product is concerned, may proceed in accordance with the following scheme.

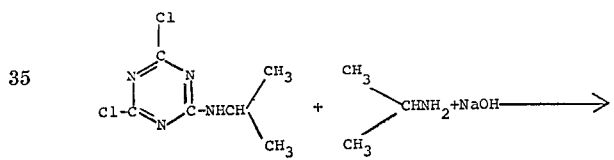

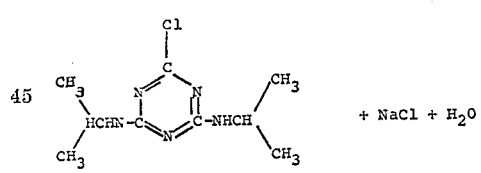

(3)

In the preparation of 2 - chloro - 4,6 - diamino - s-triazines, and illustratively, the atrazine herbicide, i.e., 2 - chloro - 4 - ethylamino - 6 - isopropylamino - s - triazine, it is, of course desirable to minimize the co-production of the by-product illustrated in Equation 3 supra and other by-products thereby avoiding difficulties in isolating the desired atrazine product when said product is produced on a large scale. It is also highly desirable to produce the 2,4 - dichloro - 6 - amino - s - triazine intermediate in high yields and purities so as to facilitate or insure efficient commercial production of the aforesaid desired atrazine product as well as other 2-chloro-4,6-diamino-s-triazines. It is therefore a principal object of the present invention to provide an improved as well as a commercially useful procedure for the preparation of 2,4 - dichloro - 6 - amino - s - triazine intermediate reaction products.

SUMMARY OF THE INVENTION

By the present invention, 2,4 - dichloro -6 - lower alkylamino-s-triazine intermediate products are produced in high yields and purities by a procedure involving initially reacting cyanuric chloride, a suitable primary or secondary amine and an alkali metal hydroxide, in substantially stoichiometric proportions, within a first reaction zone to produce a mixture in which the cyanuric chloride is substantially converted to the desired 2,4-dichloro-6-lower alkylamino-s-triazine intermediate and subsequently reacting such mixture with an additional minor portion or portions of alkali metal hydroxide to complete substitution of the first chlorine atom and formation of the desired intermediate that is, the 2,4 - dichloro - 6-lower alkylamino-s-triazine. By adding the alkali metal hydroxide in two or more stages with substantially all of the first chlorine substitution (e.g., from about 80% to about 97% thereof) effected in the initial reaction stage, an intermediate reaction product incorporating from about 0.985 to 0.995 mole of the 2,4 - dichloro-6-amino-s-triazine intermediate and from about 0.005 to 0.010 mole of the primary or secondary amine per mole of cyanuric chloride is produced. Loweralkylamino groups are intended to cover methylamino, ethylamino, n-propylamino, isopropylamino, n-butylamino, sec.-butylamine and tert.-butylamino, that is groups containing up to 4 carbon atoms.

By so conducting the reaction, an intermediate reaction product suitable for direct reaction with the selected amine and caustic to the desired herbicidal end product is provided. Thus, for example, where the preparation of the atrazine product is desired, cyanuric chloride is reacted with isopropylamine and an alkali metal hydroxide and the 2,4 - dichloro - 6 - isopropyl - amino - s - triazine intermediate is then reacted with monoethylamine and an alkali metal hydroxide. Alternatively, the atrazine produce can also be obtained by reacting cyanuric chloride with ethylamine and an alkali metal hydroxide and the 2,4 - dichloro - 6 - ethylamino - s - triazine is then reacted with isopropylamine and an alkali metal hydroxide. Similarly, the aforesaid intermediate reaction product that is, the 2,4 - dichloro -6 - isopropylamino - s - triazine, can be reacted with isopropylamine and an alkali metal hydroxide to form another commercially available herbicidal product that is, 2 - chloro - 4,6 - bis - isopropylamino-s-triazine referred to as "Propazine."

Further, using the present multi-stage technique, cyanuric chloride can be reacted with ethylamine and an alkali metal hydroxide to form 2,4 - dichloro - 6 - ethylamino - s - triazine and on reacting this last mentioned intermediate with ethylamine and an alkali metal hydroxide, another commercially important herbicide product is obtained that is, 2 - chloro - 4,6 - bis - ethylamino-s-triazine identified as simazine. The commercial herbicides referred to above as atrazine, "Propazine," and simazine are employed both as selective herbicides for weed control among cultivated plants and as soil sterilants for the total elimination of undesired plant growth.

In a similar manner, using the multi-stage procedure of the present invention, cyanuric chloride can be reacted with ethylamine and an alkali metal hydroxide to form 2,4-dichloro-6-ethylamino-s-triazine and on reacting the last mentioned product with tertiary butylamine and an alkali metal hydroxide, there is obtained 2-chloro-4-tertiary butylamino-6-ethylamino-s-triazine. This product is also useful as a herbicide for weed control among cultivated plants and also as a soil sterilant for elimination of undesired plant growth.

According to the process of the present invention, it has been found that by regulating the proportions of alkali metal hydroxide fed to the several reaction stages, carrying out substantially all of the first chlorine atom substitution in one or more successive stages, hydrolysis losses during synthesis of the intermediate are maintained at minimal levels, viz, in the order of 0.1% by weight or less. Moreover, it has been found that by so conducting the reaction, the proportion of undesired by-products is minimized (as noted, for example, in Equation 3 supra where the undesired 2 - chloro-4,6-bis-isopropylamino-s-triazine is obtained during the production of atrazine), substantially greater proportions of such material being formed in the presence of greater proportions of unreacted isopropylamine or lesser ratios of the 2,4-dichloro intermediate to cyanuric chloride than formed herein. In view of the relatively insignificant hydrolysis loss and by-product formation in the synthesis of the 2,4-dichloro-6-amino-s-triazine intermediate by the present process, the desired 2-chloro-4,6-diamino-s-triazine end products are formed in substantially higher yields and purities than heretofore possible. It should be noted that alkali metal hydroxides suitable for use in the present process include, for example, sodium hydroxide, potassium hydroxide, and the like.

BRIEF DESCRIPTION OF THE DRAWINGS

In the attached drawings:

FIG. 1 is a schematic flow diagram illustrating a two-stage reaction scheme for producing a typical 2,4-dichloro-6-amino-s-triazine intermediate, i.e., 2,4-dichloro-6-isopropylamino-2-triazine, in accordance with the process of this invention.

FIG. 2 is a graph of the conversion of cyanuric chloride to the desired 2,4 - dichloro - 6-isopropylamino-s-triazine intermediate formed in two-stage or three-stage reactions in accordance with the present process, as compared with a single-stage conversion such as heretofore employed.

DETAILED DESCRIPTION OF THE INVENTION

Figure 3:
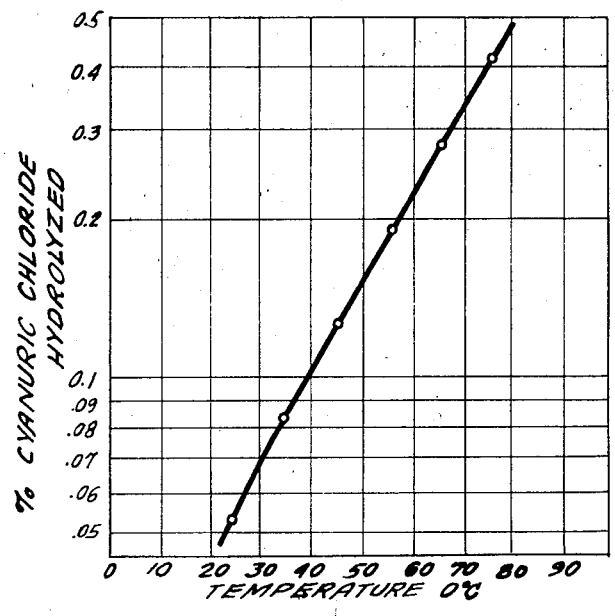
FIG. 3 illustrates the percentage of cyanuric chloride hydrolysis, in a three-stage reactor, at various temperatures.

Turning to the drawings, the schematic flow sheet shown in FIG. 1 illustrates the formation of the 2,4-dichloro-6-isopropylamino-s-triazine intermediate within a first reaction zone 10 and a second reaction zone 20, it being understood that a third or further reaction stages may alternatively be employed if desired. In the system illustrated, an isopropylamine (IPA) feed stream 11, a toluene stream 12 containing cyanuric chloride reactant dissolved therein (CC/TOL), a sodium hydroxide stream 13, and a water stream 14 are fed into reaction zone 10. The flow rates of the several feed streams are regulated to provide substantially stoichiometric quantities of the several materials reacted in accordance with Equation 1 above. Control of the respective proportions of the cyanuric chloride, isopropylamine and sodium hydroxide or other alkali metal hydroxide is quite important to assure formation of the 2,4-dichloro-6-isopropylamino-s-triazine intermediate and, ultimately, in the present example, the desired 2-chloro-4-ethylamino-6-isopropylamino-s-triazine product, i.e., in high yields and purities.

Thus, the feed of more than about 0.95 mole of caustic per mole of cyanuric chloride introduced into reaction zone 10 is undesirable since this results in a relatively high pH which promotes formation of di-substituted by-products and, consequently, relatively poor yields of the desired 2,4-dichloro-6-isopropylamino-s-triazine intermediate. At least about 0.85 mole of the alkali metal hydroxide per mole of cyanuric chloride should be fed into the reaction system (the bulk of such material being introduced into reaction zone 10 as feed stream 13, as aforesaid, and an additional minor proportion being introduced into reaction zone 20 as a supplemental feed stream 15). The use of such minimum proportion of caustic soda or other alkali metal hydroxide is important in order to assure substantial consumption of the isopropylamine reactant. The presence of substantial proportions of the isopropylamine in the 2,4-dichloro-6-isopropylamino-s-triazine intermediate-containing reaction product (when it is desired to produce atrazine), leads to decreased purities of the desired 2 - chloro-4-ethylamino-6-isopropylamino-s-triazine final product. On the other hand, the feed of less than about 0.95 mole of the isopropylamine per mole of cyanuric chloride reactant results in increased reaction times and, consequently, increased hydrolysis losses during formation of the desired intermediate. If less than stiochiometric amounts of isopropylamine are used, unreacted cyanuric chloride will enter the next reactor and will then be converted to by-products such as simazine or hydrolysis products. Accordingly, it is preferred to so correlate the feed rates of the cyanuric chloride, alkali metal hydroxide and isopropylamine that from about a 0.005 to 0.01 molar excess of isopropylamine remains in the reaction product recovered from the second reaction zone 20.

Finally, it is important to so regulate the feed rates of the respective reactants and the reaction conditions within reaction zones 10 and 20 to insure that the reaction mixtures formed within such zones contain no less than .99 mole of the 2,4-dichloro-6-isopropylamino-s-triazine intermediate per mole of the cyanuric chloride reactant present therein. It has been found that reaction mixtures containing lower ratios of such materials tend to form substantial proportions of the undesired product, 2-chloro-4,6-bis-ethylamino-s-triazine by-product, instead of the desired 2-chloro-4-ethylamino-6-isopropylamino-s-triazine, in accordance with Equation 3 above. Thus, in order to minimize the formation of such by-product, the reaction feed rates and conditions are controlled in order to maintain the molar ratio of the 2,4-dichloro-6-isopropylamino-s-triazine intermediate to cyanuric chloride reactant at a value or ratio of at least about 9:1 and preferably from about 10:1 to 20:1 in the first reaction and up to about 99:1 in the subsequent stage.

It has been found that the preceding conditions designed to minimize hydrolysis and other losses during the reaction and facilitate preparation of the 2,4-dichloro-6-isopropylamino-s-triazine intermediate in high yields and purities may conveniently be obtained by introducing from about 1.005 to about 1.010 moles of isopropylamine and from about 0.85 to about 0.97 mole of sodium hydroxide or other alkali metal hydroxide per mole of the cyanuric chloride introduced into the first reaction zone 10. Such materials, together with the toluene and water solvents, are maintained within the reaction zone, with agitation, at temperatures of less than about 100° C., preferably from about —5° to about 60° C. The mixture within the first reaction zone is further maintained at pH values of at least about 6.5, and preferably from about 7.0 to 10, by the addition of further quantities of caustic (within the noted ranges) as may be necessary. By maintaining the above feed rates and reaction conditions, substantial conversion (from about 90 to about 97 mole percent) of the cyanuric chloride to the 2,4-dichloro-6-isopropylamino-s-triazine intermediate is effected within such reaction zone. The resulting reaction mixture is recovered as stream 16 and fed for further reaction into the second reaction zone 20, into which an additional minor proportion of the alkali metal hydroxide is fed through stream 15 as aforesaid.

By introducing into the second reaction zone from about 3% to about 10% of the total amount of alkali metal hydroxide fed to the reaction system and controlling the reaction as noted below, it has been found feasible to insure accurate control of the yield and purity of the desired 2,4-dichloro-6-isopropylamino-s-triazine intermediate. The mixture formed within the second reaction zone is maintained, with agitation, at temperatures of less than about 100° C., preferably from about —5° to about 60° C. Moreover, the addition of caustic to such zone is so controlled as to maintain the pH therein at values of at least about 11.0 and preferably, from about 11.5 to about 12.0. Maintaining such conditions, as well as the several feed rates noted hereinabove, a product stream 21 is removed containing from about 0.985 to about 0.995 mole of the desired 2,4-dichloro-6-isopropylamino-s-triazine intermediate and from about 0.005 to about 0.010 mole of isopropylamine per mole of cyanuric chloride feed.

It should be noted that in FIG. 2 comparing the single-stage conversion of cyanuric chloride to the desired 2,4-dichloro-6-isopropylamino-s-triazine compound with the two-stage or three-stage reaction, there is a significant increase in conversion of said cyanuric chloride to the desired 2,4-dichloro-6-isopropylamino-s-triazine intermediate product. This significant increase in conversion using a two or three-stage reactor is of tremendous importance in the preparation of commercial quantities of the 2,4-dichloro-6-isopropylamino-s-triazine intermediate product.

FIG. 3 indicates that the hydrolysis of cyanuric chloride is almost insignificant, from the point of view of yield (or product distribution) although it would seem to indicate that hydrolysis is reduced at lower temperatures.

Figure 4:
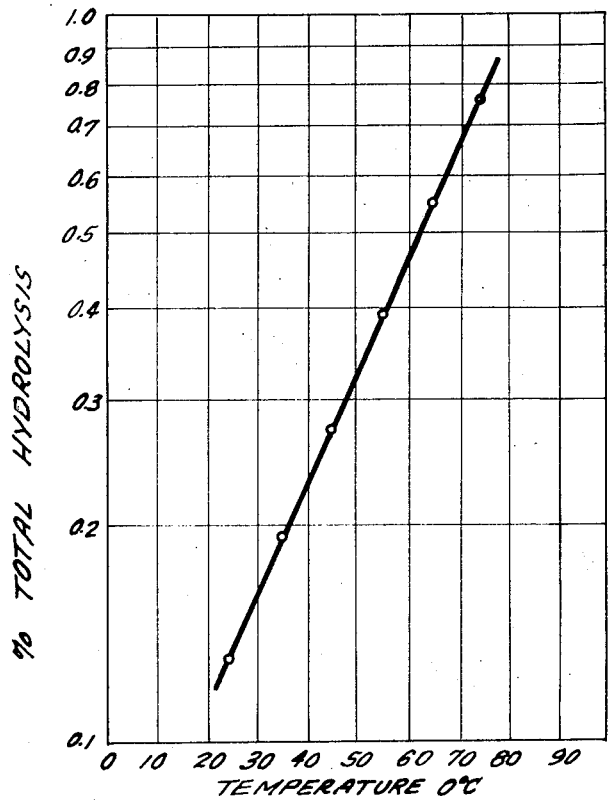
FIG. 4 is a graph illustrating total hydrolysis, in a three-stage reactor, at various temperatures.

FIG. 4 illustrates total hydrolysis that is, it includes the hydrolysis of cyanuric chloride (illustrated in FIG. 3) together with the dichloro product hydrolysis (2,4-dichloro-6-isopropylamino-s-triazine). The hydrolysis is also almost insignificant but it should also be noted that said total hydrolysis is less at lower temperatures.

The following examples are intended to illustrate one of several embodiments of the present invention and these examples are therefore not intended to be limitative.

TABLE I.—EXPERIMENTAL PARAMETERS OF TWO-STAGE DICHLORO [3] SYNTHESIS REACTION

| Example | Flow rates #/hr. | | | Temp. (° C.) | 1st stage, percent | | 2d stage, percent | | IPA [2]/mole C.C. in exit from— | | Yield loss due to hydrolysis, percent | |
|---|---|---|---|---|---|---|---|---|---|---|---|---|
| | C.C.[1] | IPA[2] | NaOH | | Prop. | C.C.[1] | Prop.[4] | C.C. | 1st stage, percent | 2d stage, percent | 1st stage | 2d stage |
| 1 | 44.5 | 13.0 | 51.8 | 5 | 0.5 | 11.3 | 0.6 | 0.3 | 10.5 | .098 | 1.63 | 2.54 |
| 2 | 30.9 | 6.0 | 55 | 15 | 0.65 | 4.7 | .74 | .47 | .49 | .165 | 10.7 | 11.7 |
| 3 | 35 | 9.8 | 38 | 5 | 1.0 | 3.5 | 1.1 | .2 | .271 | .09 | 15.5 | 11 |
| 4 | 29 | 9.5 | 32 | 15 | .49 | 9.9 | 64 | .6 | 11.7 | .077 | 4.8 | 3.6 |
| 5 | 40 | 12.8 | 47 | 15 | .43 | 5.0 | .43 | .6 | .2 | .89 | 4.54 | 2.06 |
| 6 | 39.8 | 12.4 | 33 | 5 | .28 | 12.0 | .52 | .5 | .17 | .15 | .12 | .42 |
| 7 | 39.8 | 12.4 | 33 | 15 | .35 | 4.7 | .42 | .45 | .3 | .72 | .26 | .6 |
| 8 | 39.8 | 12.4 | 33 | 15 | .32 | 11 | .57 | .25 | .78 | .072 | .1 | .59 |
| 9 | 39.7 | 13.2 | 35 | 5 | .23 | 3.8 | .27 | .35 | 18.9 | .7 | .09 | .34 |
| 10 | 39 | 13 | 34 | 5 | .21 | 11.7 | .31 | .52 | 14.0 | .07 | .16 | .33 |
| 11 | 29.6 | 8.8 | 29.5 | 15 | .42 | 4.5 | .39 | 4.5 | .11 | .10 | 7.7 | 11 |
| 12 | 32.6 | 10.4 | 26.5 | 5 | .32 | 5.4 | .30 | 5.4 | 7.0 | .72 | .14 | .12 |
| 13 | 39.8 | 12.8 | 31.5 | 25 | .13 | 5.0 | .29 | 5.0 | 1.0 | 5.0 | .13 | .09 |
| 14 | 40.2 | 11.7 | 34 | 25 | .17 | 14.1 | .34 | 14.1 | 13.1 | .14 | .192 | 1.77 |
| 15 | 38.2 | 12 | 32.5 | 25 | .33 | 4.2 | .39 | 4.2 | 1.35 | .014 | .31 | .29 |

[1] Cyanuric chloride.
[2] Isopropylamine.
[3] 2,4-dichloro-6-isopropylamino-s-triazine.
[4] Propazine.

TABLE II.—FINAL ATRAZINE PRODUCT DISTRIBUTION FROM TABLE I EXAMPLES AFTER CONVERSION TO FINAL ATRAZINE PRODUCT

| Example | Flow rates, =/hr. | | Analysis, percent | | |
|---|---|---|---|---|---|
| | MEA[1] | NaOH | Propazine | Atrazine | Simazine |
| 1 | 16.6 | 45.5 | 0.9 | 98.3 | 0.8 |
| 2 | 16.8 | 45 | 1.0 | 98.4 | 0.6 |
| 3 | 15.0 | 45 | 0.7 | 99 | 0.2 |
| 4 | 12.5 | 36 | 0.4 | 97.8 | 1.8 |
| 5 | 10.0 | 36.4 | 0.5 | 98.1 | 1.4 |
| 6 | 14 | 32 | 0.6 | 98.3 | 1.1 |
| 7 | 14 | 32 | 0.4 | 99.5 | 0.1 |
| 8 | 14 | 32 | 1.0 | 97.5 | 1.5 |
| 9 | 10 | 32 | 1.3 | 97.1 | 1.6 |
| 10 | 14 | 32 | 0.5 | 98.6 | 0.9 |
| 11 | 11.6 | 26 | 0.5 | 98.6 | 0.9 |
| 12 | 11.4 | 26 | 0.8 | 98.8 | 0.3 |
| 13 | 13.4 | 34 | 1.6 | 94.2 | 4.2 |
| 14 | 14.6 | 36.5 | 0.7 | 98.8 | 0.5 |
| 15 | 14.6 | 36 | 3.4 | 95.6 | 1.0 |

[1] Monoethylamine.

Using substantially identical procedures and conditions as set out above, runs were conducted involving in one instance the conversion of 2,4-dichloro-6-isopropylamino-s-triazine intermediate to "Propazine" by reacting the aforesaid intermediate with isopropylamine (instead of ethylamine as in the preparation of atrazine). It was found that substantially the same results were obtained as in the production of atrazine, i.e. yields of 96% and higher of "Propazine" were obtained in high purity.

Similarly, using substantially identical procedures and conditions as set out supra, substantially identical results were obtained when cyanuric chloride was reacted with ethylamine (instead of isopropylamine) to obtain the corresponding 2,4-dichloro-6-ethylamino-s-triazine intermediate. Then, once again utilizing identical procedures and conditions as set out above in the production of atrazine except for the fact that the intermediate used was 2,4-dichloro-6-ethylamino-s-triazine and this last named intermediate was reacted with ethylamine, simazine was obtained in high purity and in yields of 97% and higher.

The invention has been described with respect to certain preferred embodiments and various modifications. Variations thereof will become obvious to persons skilled in the art. It is therefore to be understood that such modifications and variations are to be included within the spirit and scope of this invention.

What is claimed is:

1. A multi-stage process for the preparation of 2,4-dichloro-6-lower alkylamino-s-triazine, which comprises:
    (a) reacting cyanuric chloride, a lower alkylamine and an alkali metal hydroxide in substantially stoichiometric proportions within a first reaction zone maintained at temperatures of less than 100° C. to produce a reaction mixture in which from about 80 to about 97 mole percent of the cyanuric chloride is converted to said 2,4-dichloro-4-lower alkylamino-s-triazine;
    (b) adding a minor amount of alkali metal hydroxide to the reaction mixture from step (a) to form a second reaction mixture; and
    (c) reacting the second reaction mixture within a second reaction zone maintained at temperatures of less than about 100° C. to form additional 2,4-chloro-6-lower alkylamino-s-triazine and thereby increase the conversion of cyanuric chloride to said 2,4-dichloro-6-lower alkylamino-s-triazine to from about 98.5 to about 99.5 mole percent.

2. A process according to claim 1 wherein the temperature in the first reaction zone is maintained at about −5° to about 60° C.

3. A process according to claim 1 in which the reaction mixture recovered from the second reaction zone is admixed with a further minor amount of an alkali metal hydroxide and reacted within a third reaction zone maintained at temperatures of less than about 100° C. to form said reaction product.

4. A process according to claim 1 in which the mixture reacted in the first reaction zone is maintained therein at pH values within the range of from about 6.5 to about 10 and at temperatures of from about −5° C. to about 60° C., and the mixture reacted in the second reaction zone is maintained therein at pH values within the range of from about 11.0 to about 12.0 and at temperatures of from about −5° to about 60° C.

5. A process according to claim 1 wherein the lower alkylamine is isopropylamine and the 2,4-dichloro-6-lower alkylamino-s-triazine is 2,4-dichloro-6-isopropylamino-s-triazine.

6. A process according to claim 1 wherein the lower alkylamine is ethylamine and the 2,4-dichloro-6-lower alkylamino-s-triazine is 2,4-dichloro-6-ethylamino-s-triazine.

References Cited

UNITED STATES PATENTS

| | | | |
|---|---|---|---|
| 2,891,855 | 6/1959 | Gysin et al. | 260—249.8 X |
| 3,235,359 | 2/1966 | Acker | 260—249.8 X |
| 3,306,725 | 2/1967 | Knusli et al. | 260—249.8 X |
| 3,436,394 | 4/1969 | Saul | 260—249.8 |

JOHN M. FORD, Primary Examiner

U.S. Cl. X.R.

260—249.8